Nov. 2, 1948.   R. D. FRANZENE   2,452,742
CRANK DEVICE
Filed June 14, 1945
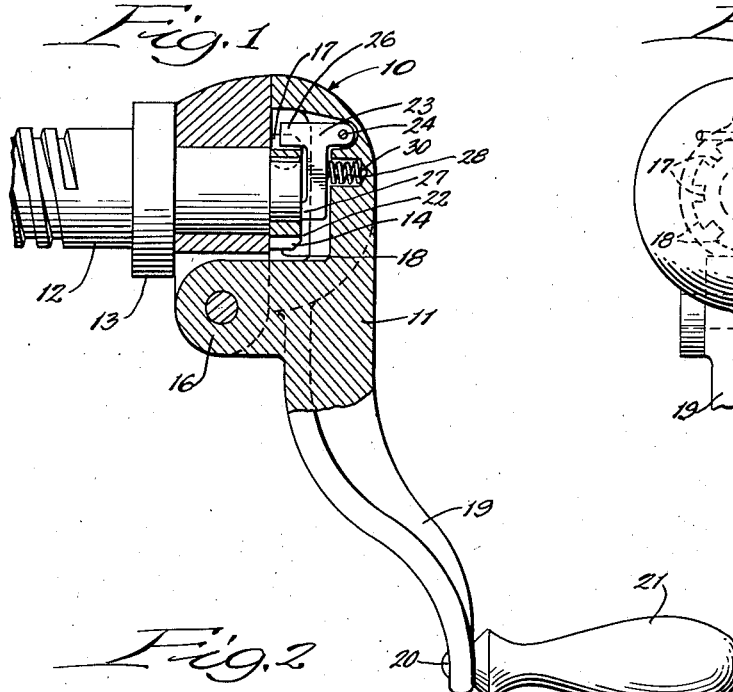
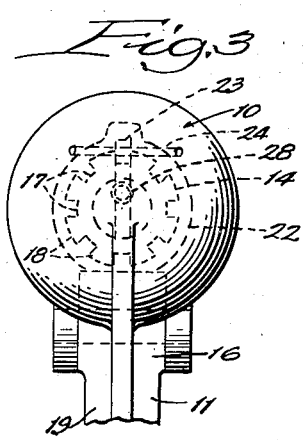
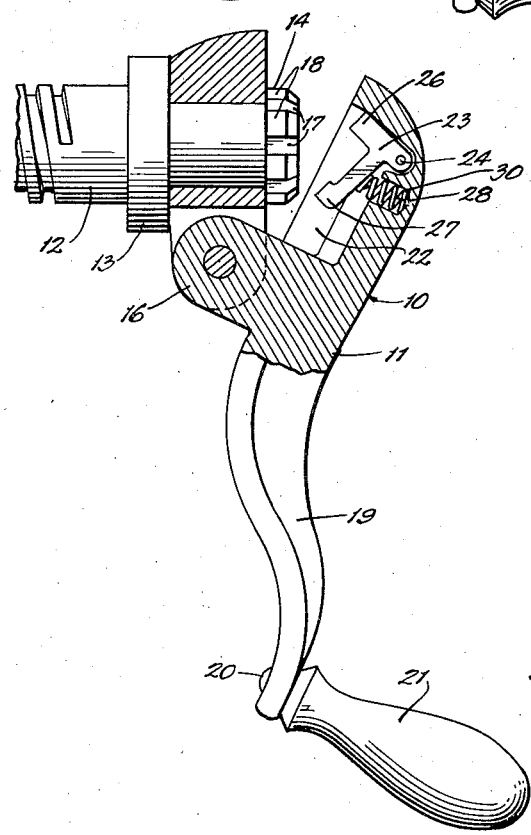
Inventor:
Robert D. Franzene,
By Dawson, Orms and Booth,
Attorneys.

Patented Nov. 2, 1948

2,452,742

UNITED STATES PATENT OFFICE 2,452,742

CRANK DEVICE

Robert D. Franzene, Lake Geneva, Wis., assignor to Henry Hildebrandt, Chicago, Ill.

Application June 14, 1945, Serial No. 599,433

2 Claims. (Cl. 74—548)

The invention relates to a crank device for manual rotation of a shaft or the like.

It is an object of the invention to provide an improved crank device.

It is a further object of the invention to provide a crank which is removably secured to a shaft or the like by a key and slot engagement.

It is also an object of the invention to provide a crank device in which disengagement from a slotted head is provided by a spring operated key.

Further objects and advantages will be apparent from the following description and the drawing appended thereto.

In the drawing, in which like reference characters refer to like parts:

Fig. 1 is a side elevational view partially in section of one embodiment of the invention illustrating a crank device in an engaged position;

Fig. 2 is a view similar to Fig. 1 illustrating the crank device disengaged; and Fig. 3 is a fragmentary front elevational view of the crank device illustrated in Fig. 1.

In the embodiment of the invention as shown in the drawings, the crank device 10 includes crank 11 for use with shaft 12. Shaft 12 has bearing 13 rotatably secured around it adjacent slotted head 14. The bearing 13 includes pivoting connection 16 to which the crank 11 is secured. The head 14 has a plurality of slots 17 formed therein. A bevel 18 may be provided around the end of the head to facilitate engagement of the crank with the head.

The crank 11 includes arm 19 having handle 21 perpendicularly secured to it. For ease of operation of the crank, a rotatable connection 20 may be provided between the arm and the handle. The length of the arm is dependent upon the degree of leverage desired in the crank device.

Means for engaging the crank to the shaft 12 is provided in recess 22 of the handle. As shown in Fig. 2, such means may comprise key 23 pivotally secured within the recess by pivotable connection 24. The key 23 includes slot engaging portion 26 and lever portion 27 which is formed perpendicularly to the slot engaging portion. The dimensions of portion 26 should be complimental to the dimensions of slot 17 so that the key 23 when in a slot may effect secure engagement of the crank to the shaft. The length of lever portion 27 should be sufficient so that it will extend beyond the slots toward the center of the shaft.

To insure disengagement of the crank 11 from the slotted head 14, spring 28 may be provided within recess 30 adjacent the key. The spring 28 is adapted to bear lever portion 27 of the key thereby tending to force the key out of engagement with slots 17.

In operating the assembled crank device, the crank 11 is placed in the engaged position shown in Fig. 1. As the crank is moved into such engagement by the operator, lever portion 27 is brought into contact with the end of shaft 12, thereby compressing spring 28 and forcing portion 26 into engagement with one of slots 17. If the slot and key are not in alignment, movement of either the shaft 12 or crank 11 will provide such alignment. While the crank 11 is being maintained in the engaged position, spring 28 tends to force portion 26 out of engagement with slot 17 by bearing against lever portion 27. This force is resisted by the operator as the crank device is operated.

When the crank is released by the operator, spring 28 forces lever portion 27 against the end of the shaft, thereby releasing portion 26 from slot 17. This release is effected irrespective of the position of the handle with respect to the rotation of the shaft 12. After the key 23 is disengaged from the head, the crank assumes a vertical position by the rotation of bearing 13. It is desirable to form the crank 11 with a center of gravity that will maintain the crank out of contact with the shaft, thereby minimizing wear of lever portion 27.

The above detailed description is merely for purposes of illustration and the invention is to be limited only by the scope of the appended claims.

I claim:

1. A crank device which comprises a shaft having a slotted head, a bearing rotatably secured to the shaft adjacent the head, and a crank pivotally secured to the bearing and having a head engaging means in a recessed portion thereof, said means including a key pivotally secured within the recess and adapted to mesh with the slotted head, and spring means bearing against the key and tending to force the key out of engagement with the head.

2. A crank device for a shaft having a slotted head at the end thereof, comprising, a bearing rotatably secured to the shaft adjacent the head, a crank pivotally secured to the bearing and having a recessed portion adapted to receive the slotted head, a key carried by the crank in the recessed portion thereof, spring means bearing against the key and tending to force the key out of engagement with the slotted head, and means for overcoming the spring means to move the key into engagement with the slotted head when the slotted head is received in the recessed portion.

ROBERT D. FRANZENE.

REFERENCES CITED

The following references are of record in the file of this patent:

UNITED STATES PATENTS

| Number | Name | Date |
|---|---|---|
| 1,115,652 | Clarke | Nov. 3, 1914 |
| 1,442,120 | Brasket | Jan. 16, 1923 |
| 1,452,758 | Ranch | Apr. 24, 1923 |
| 2,098,730 | Parker et al. | Nov. 9, 1937 |
| 2,316,266 | Marr | Apr. 13, 1943 |